UNITED STATES PATENT OFFICE 2,886,444
Patented May 12, 1959

2,886,444

PROCESS OF PREPARING A CHEWING GUM AND THE RESULTING PRODUCT

Harold Rosenthal, Newtonville, Franklin Kramer, Lexington, and Ernst Albert Steigmann, Stoneham, Mass., assignors to General Foods Corporation, New York, N.Y., a corporation of Delaware No Drawing. Application August 15, 1956
Serial No. 604,090

6 Claims. (Cl. 99—135)

This invention relates to an improved flavoring composition particularly adapted for use in chewing gum and to a process for preparing the same. More particularly it relates to a chewing gum having a flavor which is controllably released over an extended period of time and to a process for preparing the same.

Chewing gum may comprise a substantially water insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; volatile, water-immiscible flavoring agents e.g. oil of wintergreen, oil of spearmint, oil of peppermint, licorice, fruit flavors, spice oils, etc.; or sweetening agents which may be sugars including sucrose or dextrose and/or they may be artificial sweeteners such as cyclamates or saccharin. Other optional ingredients may also be present.

It is found that when most flavored chewing gums, such as slab gums, are chewed, the initial perception of flavor appears after a minute or more at a low level, and after three or four minutes of chewing, the flavor intensity drops to an uninteresting level. It is also found upon analysis that gum chewed for as long as 30 minutes may ultimately retain as much as 60% of the flavor initially present, and that this proportion of the flavoring agent is thus not effectively used.

It is an object of this invention to provide a flavoring composition, particularly adapted for use in chewing gum, which composition is characterized by an extended period of controlled flavor release. Other objects of this invention will be apparent to those skilled-in-the-art from the following detailed description of the invention.

It has now been discovered that it is possible to obtain a flavoring composition, particularly adapted for use in chewing gum, which permits attainment of a new chewing gum product characterized by extended flavor perception time, true flavor character, and controlled release of a large proportion of flavoring agent. The flavoring composition of this invention comprises very fine particles of gelatin metaphosphate containing even smaller microdroplets of a volatile, water-immiscible flavoring agent. Preparation of the flavoring composition of this invention may be effected by emulsifying volatile, water-immiscible flavoring agent within gelatin metaphosphate solution and drying the same.

The gelatin which may be employed in this invention may be any of the grades and types of gelatin, including those obtained from e.g. tanner's stock, ossein, pigskin, etc. Although the Bloom of the gelatin which is employed may vary widely, it is preferred to use gelatins having a Bloom of 40 to 250, and preferably those having a Bloom of 200 to 250. The pH of the gelatin solution employed may fall within the range of 1.5 to 7, but preferably within the range of 2 to 4. When isoionic i.e. deionized gelatin is employed, the pH will preferably be 4.7 to 5.4.

The gelatin metaphosphate may be prepared by reaction of gelatin, preferably in aqueous solution of 20%–25% concentration, with a metaphosphoric acid. The term "metaphosphoric acid," as herein employed, is intended to include within its scope acids which upon ionization yield metaphosphate ions which react with gelatin to form gelatin metaphosphate. The term "metaphosphate," as herein employed, is intended to include salts which form acids which ionize to yield metaphosphate ions which react with gelatin to form gelatin metaphosphate. These terms embrace e.g. (a) metaphosphoric acid per se i.e. $(HPO_3)_n$ and metaphosphates per se e.g. $NaPO_3$; (b) polymetaphosphates, typified by trimetaphosphates, tetrametaphosphates, hexametaphosphates, etc. and their derivative acids; and (c) polyphosphates typified by pyrophosphates as well as their derivative acids.

The phosphate used may be an ammonium or an alkali-metal salt. Preferred among these salts are calgon or sodium hexametaphosphate, sodium metaphosphate, sodium trimetaphosphate, sodium tetrametaphosphate, and sodium tripolyphosphate. The salt may be converted to the desired corresponding acid, e.g. sodium hexametaphosphate to hexametaphosphoric acid, by appropriate reaction, preferably by contact thereof with a suitable cation exchange medium which acts to replace the cation of the salt with hydrogen. The resultant acid upon ionization yields the desired metaphosphate ions.

Reaction of gelatin with the metaphosphoric acid to yield the desired gelatin metaphosphate may be effected by reacting one hundred parts by weight of gelatin with from 4 to 25 parts, say 15 parts by weight of the metaphosphoric acid. Temperature of reaction will preferably be above about 110° F.–120° F. During the reaction, the system is preferably maintained at pH below 4 and typically in the range 2 to 4. When the pH falls below the desired range, it may be raised by addition to the solution of an alkali. Preferably this will be an alkali-metal hydroxide e.g. sodium hydroxide (which will react with an acid present to yield its salt) or a salt (preferably an alkali-metal, e.g. sodium, salt) of the acid present.

The resulting gelatin metaphosphate, if present in concentration below about 14%–17%, may precipitate in the preferred pH range of 2–4. This precipitate may be separated from mother liquor by decantation followed by washing with e.g. distilled water. When the resulting gelatin metaphosphate is present in concentration above about 14%–17%, it will remain in solution, possibly because of formation of complex compounds. In the latter case, the solution may be chilled to form a firm gel which may be slab-dried or tunnel-dried (the two terms being synonymous as used herein) and ground to desired particle size of e.g. 20 mesh to less than 400 mesh. The term "drying" will be used to include separation of the precipitate from mother liquor as well as the tunnel-drying technique.

Prior to recovery of solid gelatin metaphosphate, the volatile, water-immiscible flavoring agent, e.g. methyl salicylate, may be added, preferably in amount which may be 10% to 50%, say 33% by weight of the gelatin metaphosphate. The system preferably will be at temperature of 80° F. to 140° F., preferably 110° F., when the flavoring agent is added thereto. Typically, the emulsion resulting from addition of the volatile water-immiscible flavoring agent will be homogenized before the system is further cooled. Cooling and drying permits attainment of solid gelatin metaphosphate containing encapsulated therewithin volatile water-immiscible flavoring agent. This material may be referred to as solid or dried gelatin metaphosphate emulsion.

The particles of gelatin metaphosphate encapsulated flavoring agent may be reduced to 20 to 400 mesh, preferably 40 mesh. The preferred flavoring composition of this invention may contain from 50% to 90%, preferably 67% by weight of gelatin metaphosphate and from 10% to 50%, preferably 33% by weight of volatile, water-immiscible flavoring agent.

The flavoring composition, as hereindescribed, is particularly adapted for use in chewing gum. Formation of flavored crewing gum may be effected by mixing in known manner from 3% to 30%, say 15% by weight of flavoring composition with from 70% to 97%, say 85% by weight of gum base. Typically the gum base will be chicle, although it may be e.g. jelutong, guttakay, etc. Other ingredients including sweetening agents, coloring agents, etc. may also be present in the desired product.

The resulting chewing gum product may comprise an all-enveloping mass of gum base such as chicle, within which is substantially uniformly distributed particles of powdered gelatin metaphasphate-encapsulated flavoring agent. Although the mixing procedure followed may result in transfer of some of the flavoring agent from the gelatin metaphosphate encapsulation to the gum, substantially all of the flavoring agent will be found in the gelatin metaphosphate encapsulation after mixing.

It is characteristic of this chewing gum product that it retains its flavor under conditions of vigorous mastication for extended periods which may be 2–3 times that of compositions heretofore known. For example, under certain conditions, the flavor perception time may be ten minutes or longer in contrast to the usual three minutes which is the flavor perception time of comparable products known to those skilled-in-the-art.

The chewing gum so formed is also characterized by high degree of flavor release. Prior art gums when masticated for 30 minutes are found to contain as much as 60% of the flavor originally present. The product herein described may have as little as 30%–35% of the flavor originally present.

The flavor release of the chewing gum is also characterized by a high degree of control whereby the flavor present will be liberated at controlled rate over the period of mastication with substantially true flavor character.

It is also a particularly desirable feature of chewing gums containing gelatin metaphosphate, that they possess a very smooth texture even when the gelatin employed is of very high Bloom, e.g. 250 Bloom, and even when the gelatin metaphosphate is present in large particle sizes e.g. 20–35 mesh.

The following specific examples will serve to illustrate certain preferred embodiments of this invention:

Example I 1000 g. of neutral gelatin (having a Bloom of 235) was dissolved in 3000 g. of distilled water. 170 g. of potassium metaphosphate was dissolved in 3230 g. of distilled water and sulfuric acid was added until the pH dropped to 0.75. The metaphosphoric acid solution was added to the gelatin solution and the mixture was agitated and cooled to 120° F. 585 g. of oil of peppermint was added and the mixture was homogenized.

The liquid was placed in flat shallow pans and cooled at about 50° F. until a firm gel was formed. This resulting gel was air dried at room temperature, and then ground to 24–35 mesh. 15 parts by weight of this flavor composition were blended with 100 parts of chicle.

Example II 1000 g. of neutral gelatin (having a Bloom of 235) was dissolved in 3000 g. of distilled water. 170 g. of calgon or sodium hexametaphosphate was dissolved in 3230 g. of distilled water and sulfuric acid was added until the pH dropped to 0.75. The metaphosphoric acid solution was added to the gelatin solution and the mixture was agitated and cooled to 120° F. 585 g. of oil of peppermint was added and the mixture was homogenized.

The liquid was placed in flat shallow pans and cooled at about 50° F. until a firm gel was formed. This resulting gel was air dried at room temperature, and then ground to 24–35 mesh. 15 parts by weight of this flavor composition were blended with 100 parts of chicle.

Example III 200 g. of potassium metaphosphate was dissolved in 1800 g. of distilled water. Dowex 50, a synthetic cation exchange resin containing nuclear sulfonic acid groups attached to a styrene-divinyl benzene matrix, was added to the solution until the pH dropped to 1. The resin was then separated from the solution by filtration.

The solution was diluted to 5% metaphosphate concentration. A volume containing 170 g. of ion-exchanged metaphosphate was added to a solution formed from 1000 g. of neutral gelatin (having a Bloom of 235) and 3000 g. of distilled water. The mixture was agitated and cooled to 120° F., 585 g. of oil of peppermint was added, and the mixture was homogenized.

The mixture was placed in flat shallow pans and cooled at about 50° F. until a firm gel was formed. This resulting gel was air dried at room temperature, and then ground to 24–35 mesh. 15 parts by weight of this flavor composition were blended with 100 parts by weight of chicle.

Example IV 200 g. of calgon or sodium hexametaphosphate was dissolved in 1800 g. of distilled water. Dowex 50, a synthetic cation exchange resin containing nuclear sulfonic acid groups attached to a styrene-divinyl benzene matrix was added to the solution until the pH dropped to 1. The resin was then separated from the solution by filtration.

The solution was diluted to 5% metaphosphate concentration. A volume containing 170 g. of ion-exchanged metaphosphate was added to a solution formed from 1000 g. of neutral gelatin (having a Bloom of 235) and 3000 g. of distilled water. The mixture was agitated and cooled to 120° F., 585 g. of oil of peppermint was added, and the mixture was homogenized.

The mixture was placed in flat shallow pans and cooled at about 50° F. until a firm gel was formed. This resulting gel was air dried at room temperature, and then ground to 24–35 mesh. 15 parts by weight of this flavor composition were blended with 100 parts by weight of chicle.

A taste test was made to compare a chewing gum product of this invention with a standard chewing gum containing the same total amount of flavor in unfixed form. During the tests, 0.5 x 0.75 x 0.0625 inches slabs of each gum were separately chewed and the following were noted: time and intensity of initial flavor, extent of flavor burst, duration of interesting flavor level, and approximate total time during which flavor was available. In these tests, the rating of flavor intensity was measured by the person chewing, on a scale ranging from 0 to 10, the level of 1 indicating threshold flavor intensity just discernible to the taste, and a level of 10 indicating a maximum intensity above which the sensation originating in the flavor is unpleasant.

The commercially available standard containing unfixed flavor in chicle was characterized by initial indication of flavor at a level of 1 after about 7–8 seconds. Intensity rose to 3 at about 15 seconds, and thereafter at a slower rate to a level of 6 at about 60 seconds. At this point, flavor intensity dropped off to 3 after about 90 seconds. At about 2 minutes, the flavor intensity was at the uninteresting low level of 1.5. After 4 minutes of chewing, the flavor had dropped below the threshold value of 1, and the standard gum was flat and lifeless.

Initial flavor liberation in a sample prepared according to Example II of this invention occurred at level 1 after about 15 seconds. Intensity gradually rose to level of 10 after 2 minutes and then gradually dropped to about 7 at 4 minutes. It remained at this level until about 7 minutes after which it gradually dropped to level of 1 at about 10 minutes.

For ease of comparison, the results of the taste test are presented in tabular form:

| Time | Standard | Example I |
|---|---|---|
| 0 Seconds | | |
| 5 Seconds | | |
| 7 Seconds | 1 | |
| 10 Seconds | 2 | |
| 15 Seconds | 3 | 1 |
| 20 Seconds | 4 | |
| 30 Seconds | 5 | 2 |
| 45 Seconds | | 3 |
| 60 Seconds | 5 | 4 |
| 90 Seconds | 3 | 7 |
| 2 Minutes | 1.5 | 10 |
| 3 Minutes | 1 | 8.5 |
| 4 Minutes | 1 | 7 |
| 5 Minutes | | 7 |
| 6 Minutes | | 7 |
| 7 Minutes | | 7 |
| 8 Minutes | | 5 |
| 9 Minutes | | 3 |
| 10 Minutes | | 1 |

It is apparent to the persons making the chewing test that the chewing gum containing the flavoring composition of this invention is superior to the sample containing the flavoring oil in unfixed form. Specifically the product of this invention is characterized by extended flavor perception time, true flavor character, and high degree of flavor release.

Although we have herein described specific examples showing certain details of our invention, it will be apparent to those skilled-in-the-art that various modifications and changes may be made which come within the scope of this invention.

What is claimed is:

1. A chewing gum comprising particles of gelatin metaphosphate, discrete micro-droplets of a volatile, water-immiscible flavoring agent distributed within each of said particles, and an all-enveloping mass of a chewable gum base within which the particles are substantially uniformly distributed.

2. A chewing gum comprising a plurality of 20 mesh to 400 mesh particles of gelatin metaphosphate, discrete micro-droplets of a volatile, water-immiscible flavoring agent distributed within each of said particles, and an all-enveloping mass of a chewable gum base within which the particles are substantially uniformly distributed.

3. A chewing gum comprising 3% to 30% by weight of particles of gelatin metaphosphate each containing a volatile, water-immiscible flavoring agent distributed in the form of discrete micro-droplets therewithin, and 70% to 97% by weight of an all-enveloping mass of a chewable gum base within which the particles are substantially uniformly distributed.

4. A chewing gum comprising a plurality of particles of gelatin hexametaphosphate, discrete micro-droplets of a volatile, water-immiscible flavoring agent distributed within each of said particles, and an all-enveloping mass of a chewable gum base within which the particles are substantially uniformly distributed.

5. The method of preparing a chewing gum which comprises forming particles of gelatin metaphosphate containing discrete micro-droplets of a volatile, water-immiscible flavoring agent distributed therein, and substantially uniformly distributing said particles within an all-enveloping mass of a chewable gum base.

6. The method of preparing a chewing gum which comprises forming a gelatin solution, reacting said gelatin with a metaphosphoric acid thereby forming gelatin metaphosphate, drying said gelatin metaphosphate to form particles thereof, adding a volatile, water-immiscible flavoring agent to said gelatin metaphosphate before the same is dried, and distributing said gelatin metaphosphate particles within an all-enveloping mass of a chewable gum base.

References Cited in the file of this patent

UNITED STATES PATENTS

| | | |
|---|---|---|
| 1,526,039 | Arkell et al. | Feb. 10, 1925 |
| 2,196,300 | Grettie | Apr. 9, 1940 |
| 2,369,847 | Olson et al. | Feb. 20, 1945 |

FOREIGN PATENTS

| | | |
|---|---|---|
| 361,138 | Great Britain | Nov. 19, 1931 |

UNITED STATES PATENT OFFICE
CERTIFICATE OF CORRECTION

Patent No. 2,886,444                                                      May 12, 1959

Harold Rosenthal et al.

It is hereby certified that error appears in the printed specification of the above numbered patent requiring correction and that the said Letters Patent should read as corrected below.

Column 2, line 34, after "about" insert -- 100° F., and preferably at about --; column 3, line 9, for "crewing" read -- chewing --; line 19, for "metaphasphate-encapsulated" read -- metaphosphate-encapsulated --; column 4, line 74, after "level" insert -- of --; column 5, in the table, under the heading "Standard", opposite "60 Seconds", for the numeral "5" read -- 6 --.

Signed and sealed this 22nd day of September 1959.

(SEAL)
Attest:

KARL H. AXLINE                                                   ROBERT C. WATSON
Attesting Officer                                        Commissioner of Patents